United States Patent
Rana et al.

(10) Patent No.: US 9,607,012 B2
(45) Date of Patent: Mar. 28, 2017

(54) INTERACTIVE GRAPHICAL DOCUMENT INSIGHT ELEMENT

(71) Applicants: Dharmesh Rana, Nadiad (IN); Anand Sinha, Bangalore (IN)

(72) Inventors: Dharmesh Rana, Nadiad (IN); Anand Sinha, Bangalore (IN)

(73) Assignee: BUSINESS OBJECTS SOFTWARE LIMITED, Dublin (IE)

( * ) Notice: Subject to any disclaimer, the term of this patent is extended or adjusted under 35 U.S.C. 154(b) by 256 days.

(21) Appl. No.: 13/786,466

(22) Filed: Mar. 6, 2013

(65) Prior Publication Data

US 2014/0258927 A1    Sep. 11, 2014

(51) Int. Cl.
G06F 3/0482 (2013.01)
G06F 17/30 (2006.01)

(52) U.S. Cl.
CPC ............................. G06F 17/30265 (2013.01)

(58) Field of Classification Search
CPC .................................................. G06F 3/0481
See application file for complete search history.

(56) References Cited

U.S. PATENT DOCUMENTS

| | | | |
|---|---|---|---|
| 6,735,586 B2 | 5/2004 | Timmons | |
| 7,234,105 B2 | 6/2007 | Bezrukov et al. | |
| 7,490,040 B2 * | 2/2009 | Pickering | G10L 13/08 704/260 |
| 7,542,958 B1 * | 6/2009 | Warren | G06F 17/3089 706/48 |
| 7,599,950 B2 * | 10/2009 | Walther | G06F 17/30696 |
| 7,685,510 B2 | 3/2010 | Sauermann | |
| 7,739,354 B2 | 6/2010 | Gvily | |
| 7,865,538 B2 * | 1/2011 | Prager et al. | 707/828 |
| 8,090,698 B2 | 1/2012 | Billingsley et al. | |
| 8,266,162 B2 | 9/2012 | Cava | |
| 8,442,940 B1 * | 5/2013 | Faletti | G06F 17/2785 704/9 |
| 8,478,756 B2 | 7/2013 | Heix et al. | |
| 8,533,608 B1 * | 9/2013 | Tantiprasut | 715/751 |
| 8,577,887 B2 | 11/2013 | Joshi et al. | |
| 2002/0016800 A1 | 2/2002 | Spivak et al. | |
| 2004/0024662 A1 * | 2/2004 | Gray et al. | 705/29 |
| 2004/0167896 A1 * | 8/2004 | Eakin | G06F 17/30873 |
| 2004/0187111 A1 * | 9/2004 | Eakin | G06F 17/30893 718/100 |
| 2004/0230572 A1 * | 11/2004 | Omoigui | G06F 17/30528 |
| 2006/0004703 A1 * | 1/2006 | Spivack | G06F 17/3089 |

(Continued)

OTHER PUBLICATIONS

Steven Feiner et al.; An Experimental System for Creating and Presenting Interactive Graphical Documents; Jan. 1982;ACM; p. 60.*

*Primary Examiner* — Phenuel Salomon

(57) ABSTRACT

In one embodiment, metadata associated with a document is received. At least one keyword is extracted from the received metadata, wherein the at least one keyword include at least one of actionable information and non-actionable information. Further, an interactive graphical document insight element is generated including a representation of the non-actionable information and one or more interactive icons representing the actionable information. The generated interactive graphical document insight element is rendered on a computer generated user interface.

20 Claims, 6 Drawing Sheets

(56) References Cited

U.S. PATENT DOCUMENTS

| | | | |
|---|---|---|---|
| 2007/0050412 A1* | 3/2007 | Robertson et al. | 707/104.1 |
| 2007/0130602 A1* | 6/2007 | Gulli | H04N 7/17318 |
| | | | 725/113 |
| 2007/0255741 A1 | 11/2007 | Geiger et al. | |
| 2007/0255754 A1* | 11/2007 | Gheel | G06F 17/30867 |
| 2009/0138466 A1* | 5/2009 | Henry et al. | 707/5 |
| 2009/0276694 A1* | 11/2009 | Henry et al. | 715/243 |
| 2010/0198835 A1 | 8/2010 | Sorvari et al. | |
| 2010/0312680 A1* | 12/2010 | Jung | G06Q 20/10 |
| | | | 705/35 |
| 2011/0184863 A1* | 7/2011 | Coleman et al. | 705/40 |
| 2011/0225523 A1* | 9/2011 | Newton et al. | 715/762 |
| 2011/0307814 A1* | 12/2011 | Audet | G06F 3/04815 |
| | | | 715/764 |
| 2012/0011147 A1 | 1/2012 | Gupta | |
| 2012/0191716 A1* | 7/2012 | Omoigui | H01L 27/1463 |
| | | | 707/740 |
| 2013/0091132 A1 | 4/2013 | Khalatov et al. | |
| 2013/0159926 A1 | 6/2013 | Vainer et al. | |
| 2013/0227622 A1* | 8/2013 | Landow et al. | 725/93 |

\* cited by examiner

INTERACTIVE GRAPHICAL DOCUMENT INSIGHT ELEMENT

FIELD

Embodiments generally relate to graphical user interfaces and more particularly to methods and systems to provide an interactive graphical document insight element.

BACKGROUND

With the rapid increase in the number of document transactions in a business application, retrieving a relevant document is always a challenge. Conventional search applications provide a citation list of documents in response to a search query through icons or thumbnail images. For example, a user can access the documents based on their citation and select one of the citations in order to view the content of the document. Also, to view the information within the document or to determine whether the document is relevant or not, the user has to access the content of the document by opening the document. This process becomes time consuming when there is a large number of documents to be analyzed.

BRIEF DESCRIPTION OF THE DRAWINGS

The claims set forth the embodiments with particularity. The embodiments are illustrated by way of examples and not by way of limitation in the figures of the accompanying drawings in which like references indicate similar elements. The embodiments, together with its advantages, may be best understood from the following detailed description taken in conjunction with the accompanying drawings.

DETAILED DESCRIPTION

Embodiments of techniques to generate an interactive graphical document insight element are described herein. According to various embodiments, the interactive graphical document insight element represents a document. The document may be web content that is published or distributed in a digital form, such as or a combination of a text, an audio, a video, an image, a software application and the like using Internet, or non-web content that is locally stored in a system such as a Microsoft® word document, Microsoft® Excel document, Adobe® PDF document and the like. In one embodiment, the interactive graphical document insight element is generated by parsing metadata associated with the document. The interactive graphical document insight element provides a graphical representation of the document by rendering information about the document in a consumable form to a user. The interactive graphical document insight element provides insightful display of the document, so that the user can view and/or access the information of the document without accessing the actual content of the document (e.g., without opening the document).

Reference throughout this specification to "one embodiment", "this embodiment" and similar phrases, means that a particular feature, structure, or characteristic described in connection with the embodiment is included in at least one of the one or more embodiments. Thus, the appearances of these phrases in various places throughout this specification are not necessarily all referring to the same embodiment. Furthermore, the particular features, structures, or characteristics may be combined in any suitable manner in one or more embodiments.

Figure 1:
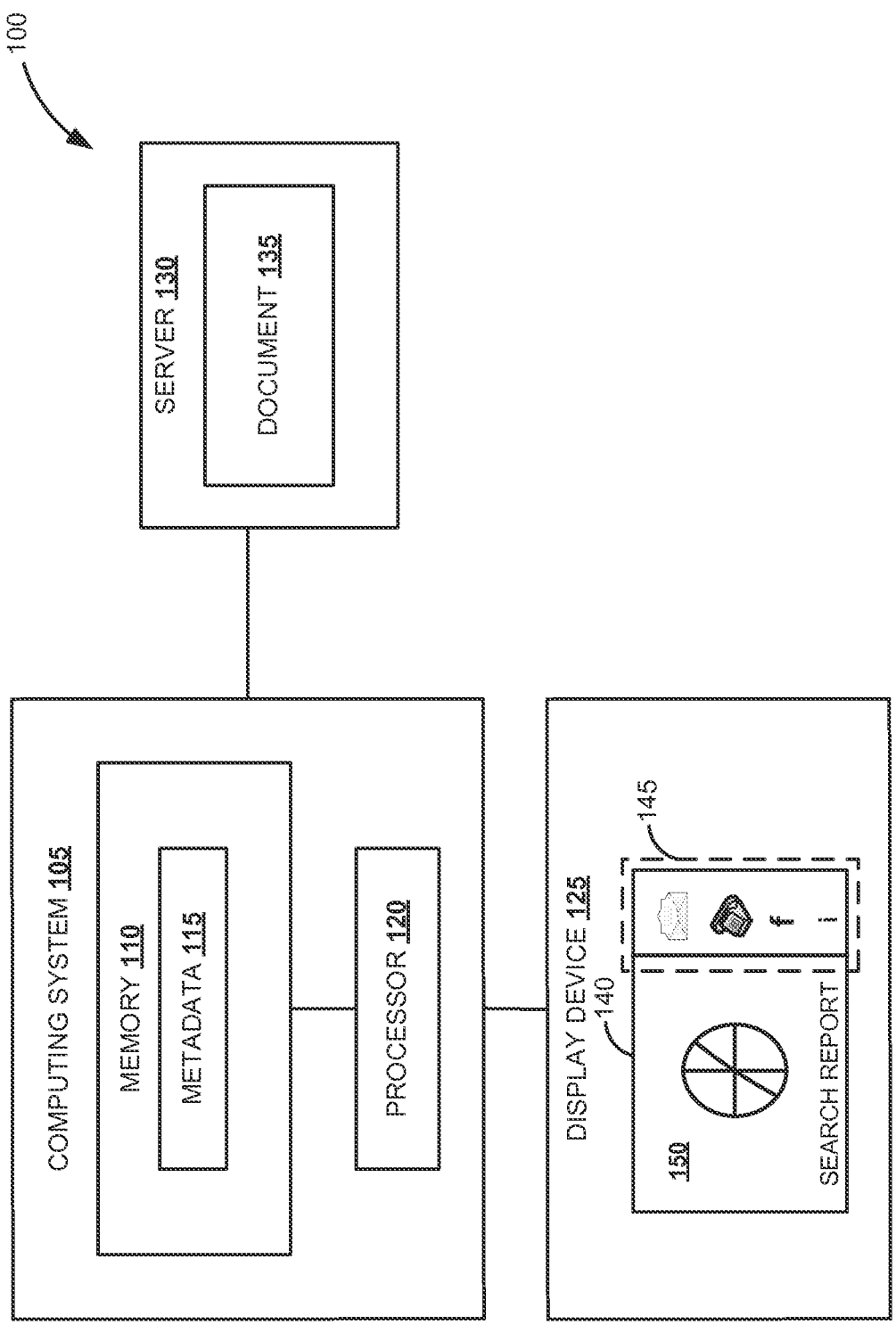
FIG. 1 is a block diagram illustrating a computing system to provide an interactive graphical document insight element, according to an embodiment.

FIG. 1 is a block diagram 100 illustrating a computing system 105 to provide an interactive graphical document insight element 140, according to an embodiment. The block diagram 100 includes the computing system 105 to generate the interactive graphical document insight element 140 representing a document 135, which may be stored in a server 130, for instance. Further, the computing system 105 is connected to a display device 125 to display the generated interactive graphical document insight element 140. Further, the computing system 105 includes a memory 110 and a processor 120 to execute instructions stored in the memory 110. In one exemplary embodiment, the document may be web content (e.g., a document published in a digital form using Internet) or non-web content (e.g., a locally stored document).

In one embodiment, metadata 115 associated with the document 135 is received and stored in the memory 110. Further, the interactive graphical document insight element 140 is generated based on the metadata 115. The metadata 115 is parsed to extract keywords or attributes. For example, the metadata 115 may include a uniform resource locator (URL) associated with the document and the keywords are extracted by parsing the URL. Further, the keywords are classified as actionable information or non-actionable information. The non-actionable information is defined as information which provides some static information about the document (e.g., a background image of the document, a title of the document, a short description of the document and the like), whereas the actionable information is defined as information from which a further action can be performed (e.g., actionable information: an email ID; further action: to compose an email to the mentioned email ID). The actionable information and non-actionable information are described in greater detail in FIG. 2. Further, the interactive graphical document insight element 140 is generated using the extracted keywords. The method of generating the interactive graphical document insight element 140 is described further with an example in FIG. 2.

The interactive graphical document insight element 140 provides a user with a view of non-actionable information (e.g., 150 such as background image and title of the document 135) associated with the document 135, and a plurality of actionable icons 145 representing actionable information. For example, the actionable icons 145 provide a link to an agnostic viewable content (e.g., links to external documents such as Microsoft® Word, a Microsoft® Excel, an Adobe® PDF and HTML content), a live collaboration link (e.g., links to intra-corporate discussion forums or social networking sites), an email link to a concerned person associated with the document 135, a link to a contact number of the concerned person, and the like. Thereby the content of the document 135 can be accessed and used through the interactive graphical document insight element 140 without actually opening the document 135.

Figure 2:
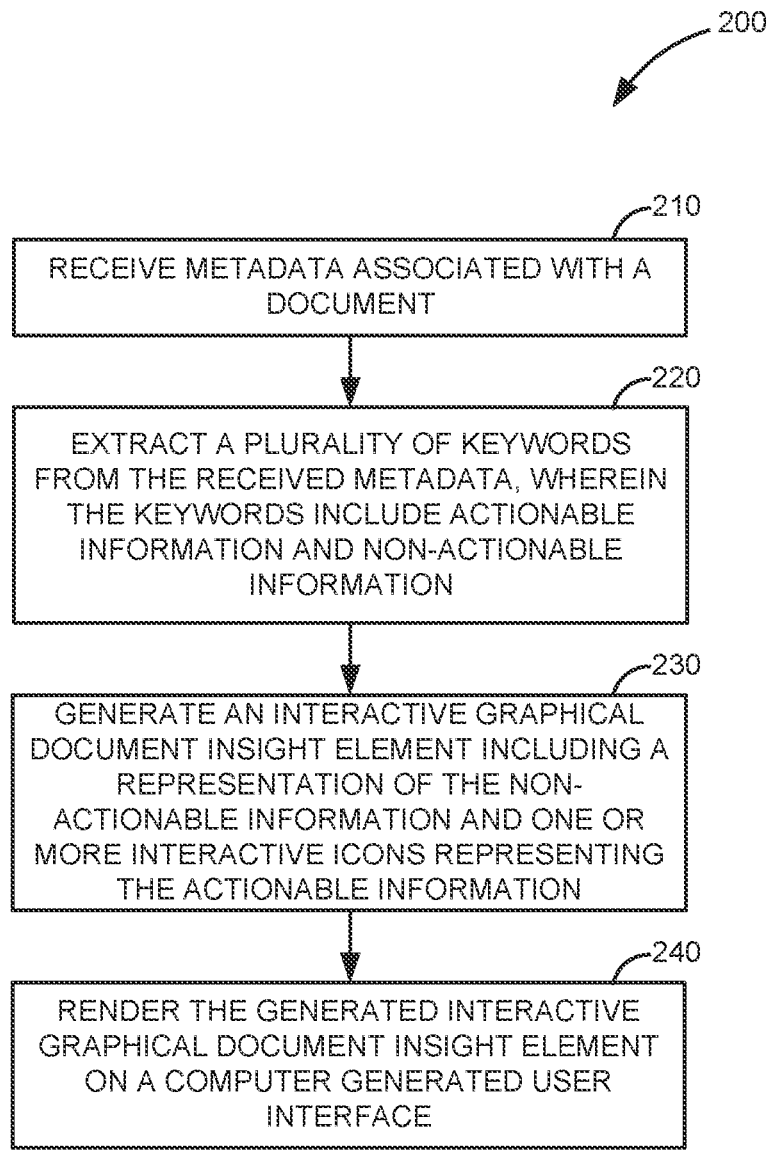
FIG. 2 is a flow diagram illustrating a method to generate an interactive graphical document insight element, according to an embodiment.

FIG. 2 is a flow diagram 200 illustrating a method to generate an interactive graphical document insight element, according to an embodiment. At process block 210, metadata associated with a document is received. The metadata is defined as structured information describing significant aspects of the document. In other words, the metadata includes at least one keyword associated with the document which explains and locates the document. For example, the keywords may include but not limited to a title of the document, a short description of the document, an image associated with the document, an agnostic viewable content associated with the document, a live collaboration link, contact information of concerned people associated with the document like email addresses, phone numbers, contact names, mailing addresses and the like.

For example, the metadata associated with a document 'sales report' includes a reference to an image (e.g., http://www.myurl.com/sales.png), contact information, a title of the document (e.g., 'sales report 2012'), a description of the document, a link to a social networking site, a link to a whitepaper associated with the document, geo location information, document size and document format.

At process block 220, the keywords are extracted from the received metadata. The extraction of keywords further includes classifying the keywords into actionable information and non-actionable information. For example, the non-actionable information includes an image representing the document or references to the image to infer more information of the document, a title of the document, a description of the document, and/or the like. Further, the actionable information includes contact information, a link to agnostic viewable document (e.g., links to external documents such a Microsoft® Word, a Microsoft® Excel, an Adobe® PDF and HTML content), a link to live collaboration (e.g., links to intra-corporate discussion forums or social networking sites) and/or the like.

In the above example, the non-actionable information includes a bitmap image (e.g., sales.png) retrieved from http://www.myurl.com/sales.png and the title of the document 'sales report 2012'. The actionable information includes the contact information (e.g., email id and contact number), the link to a social networking site (e.g., Facebook®), a link to a whitepaper associated with the document.

Figure 3:
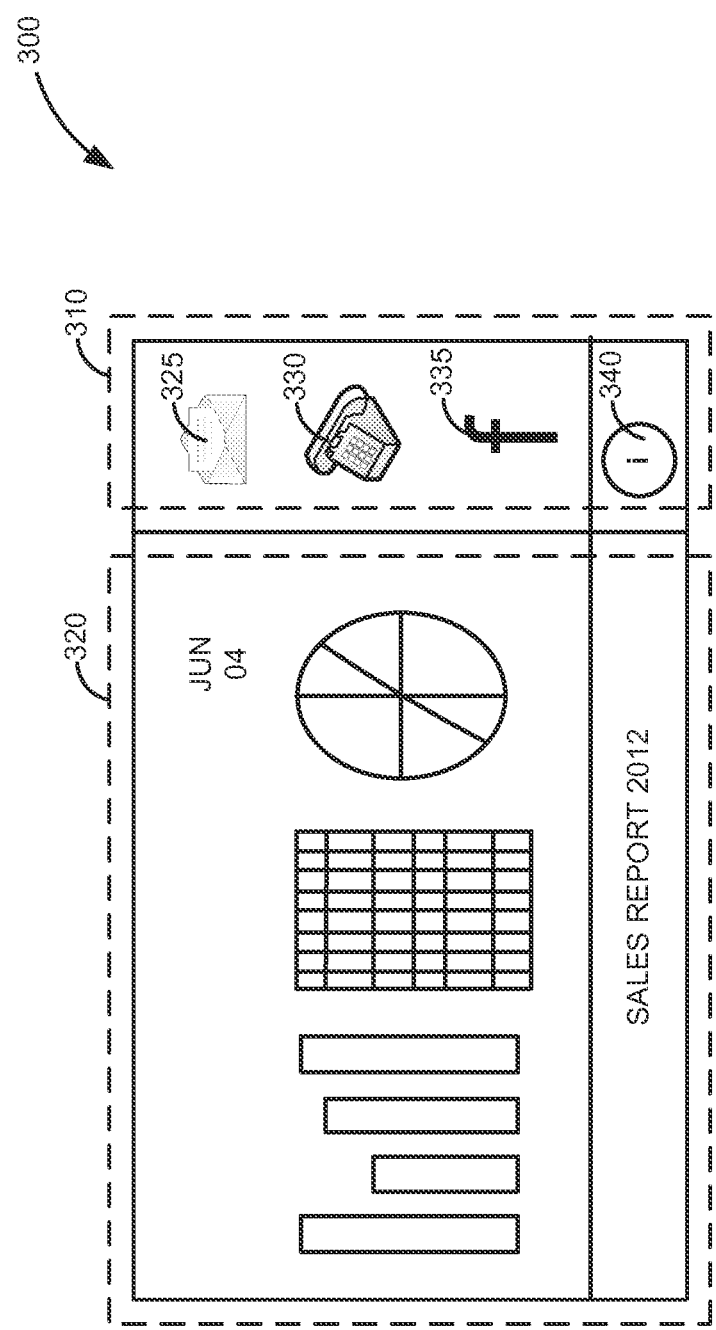
FIG. 3 is a block diagram illustrating an exemplary interactive graphical document insight element, according to an embodiment.

At process block 230, the interactive graphical document insight element is generated based on the actionable information and the non-actionable information. In one embodiment, the interactive graphical document insight element includes a representation of the non-actionable information and one or more interactive icons representing the actionable information. The interactive icons provide an option to perform actions corresponding to the actionable information. At process block 240, the generated interactive graphical document insight element is rendered on a computer generated user interface. For example, an exemplary interactive graphical document insight element 300 for the document 'sales report' is shown in FIG. 3. The interactive graphical document insight element 300 includes representation of non-actionable information (e.g., 320) such as the bitmap image (e.g., sales.png) and the title of the document 'sales report 2012'. In one exemplary embodiment, the image representing the document is retrieved from an associated repository and rendered on the interactive graphical document insight element 300. The method of retrieving the image is described in greater detail in FIG. 5.

Further, the interactive graphical document insight element 300 includes actionable information (e.g., 310) displayed through the interactive icons (e.g., 310) such as a link to an email id of a concerned person associated with the document (e.g., 325), a link to the contact numbers of the concerned people associated with the document (e.g., 330), a link to asocial networking site (e.g., 335), a link to a whitepaper associated with the document (e.g., 340). Further, when a user selects the interactive icon 325, an email can be composed to the concerned person (e.g., abc@xyz.com). Further, when the interactive icon 330 is selected, a phone call can be made to the concerned person. When the interactive icon 335 is selected, a page of the social networking site (e.g., Facebook®) associated with the document is opened. Further, when the interactive icon 340 is selected, the link to the whitepaper associated with the document can be accessed. In other words, the user can directly call, send email or SMS to the concerned person associated with the document.

Figure 4:
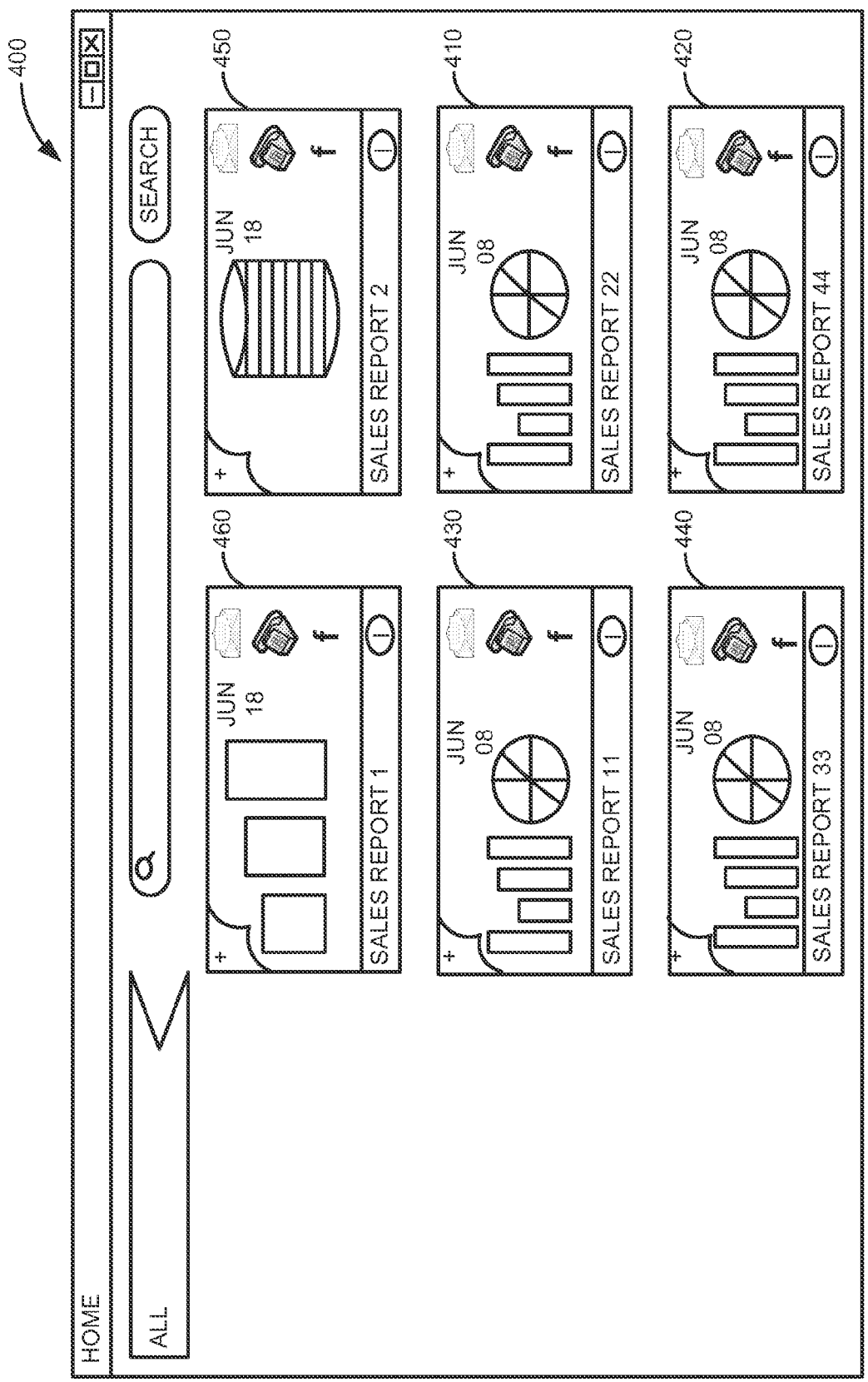
FIG. 4 is a block diagram illustrating a graphical user interface displaying exemplary interactive graphical document insight elements, according to an embodiment.

FIG. 4 is a block diagram illustrating a graphical user interface 400 displaying exemplary interactive graphical document insight elements, according to an embodiment. For example, interactive graphical document insight elements are generated for a list of business intelligence (BI) documents and the same is displayed in a graphical user interface 400. In one exemplary embodiment, a user can easily visualize similar kind of BI documents among the displayed interactive graphical document insight elements. Since the keywords of similar BI documents are same, the interactive graphical document insight elements corresponding to the similar BI documents appear similar (e.g., the interactive graphical document insight elements 410, 420, 430 and 440 appear similar when compared to 450 and 460). Therefore, it is advantageous that by representing the documents using the interactive graphical document insight elements, different kinds of documents having matching keywords can be grouped. This can be extremely useful to find which documents are closely associated with a given document and the user can browse through them to do further analysis.

Figure 5:
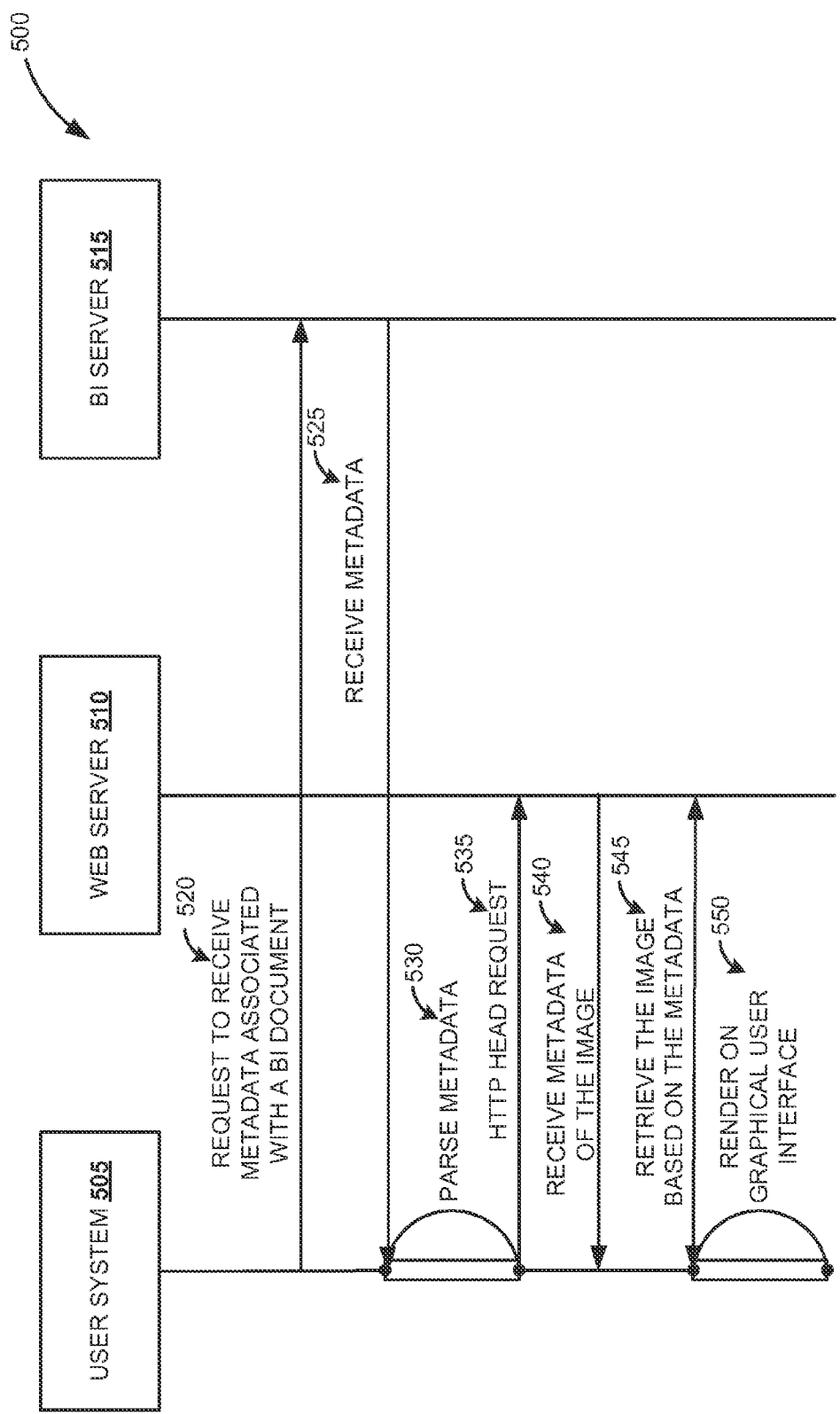
FIG. 5 is a sequence diagram illustrating an exemplary data flow for retrieving an image associated with a business intelligence (BI) document, according to an embodiment.

FIG. 5 is a sequence diagram 500 illustrating an exemplary data flow for retrieving an image associated with a business intelligence (BI) document, according to an embodiment. The sequence diagram 500 represents the interactions and the operations involved in the method to retrieve the image associated with the BI document. FIG. 5 illustrates process objects including a user system 505, a web server 510 and a BI server 515 along with their respective vertical lines originating from them. The vertical lines of the user system 505, the web server 510 and the BI server 515 represent the processes that may exist simultaneously. The horizontal lines (e.g., 520, 525, 535, 540 and 545) represent execution of the method between the vertical lines originating from their respective process objects (e.g., the user system 505, the web server 510 and the BI server 515). Activation boxes (e.g., 530 and 550) represent the steps that are being performed in the respective process object (e.g., the user system 505, the web server 510 and the BI server 515).

At step 520, a request to receive metadata associated with the BI document is sent to the corresponding BI server 515. In response to the request, the BI server 515 sends the metadata associated with the BI document to the user system 505 at step 525. In one exemplary embodiment, the metadata of the BI document may include a customized URL to include context sensitive parameters, for example, specifying various filter, passing geo location information and the like (e.g. the metadata of the BI document 'sales revenue' can be, http://www.myurl.com/sales.png biurl://myurl.com/opendocument?id=ABCD&filter=Quarter1). At activation box 530, the received metadata is parsed. In other words, keywords are automatically extracted from the received metadata to represent the BI document using an interactive graphical document insight element. In one embodiment, the keywords include actionable information and non-actionable information. For example, considering a keyword 'sales.png' is extracted, a bitmap image 'sales.png' has to be retrieved to display on the interactive graphical document insight element.

At step 535, a Hypertext Transfer Protocol (HTTP) HEAD request is sent to the corresponding web server 510 (e.g., the web server 510 is associated with myurl.com) to retrieve metadata of the bitmap image 'sales.png'. The HTTP defines methods to indicate the desired action to be performed on the identified server. Further, HTTP HEAD request is useful for retrieving meta-information written in response headers, without having to transport the entire content. At step 540, the metadata of the bitmap image is received from the web server 510. At step 545, based on the received metadata of the bitmap image, the bitmap image parameters are checked (e.g., size, image format and the like). Further depending on the display capacity and the bitmap image parameters, the bitmap image is fetched from the corresponding web server 510 (e.g., through HTTP GET request). At activation box 550, the fetched bitmap image is rendered on the interactive graphical document insight element.

In one exemplary embodiment, in a scenario where the referenced image is of larger size, the HTTP HEAD request is sent to fetch only limited information instead of completely loading the image. This helps in reducing the data transfer significantly. In one exemplary embodiment, instead of downloading the image every time, the image can be locally stored for offline use as well. When checking whether re-download the image is required or not, the HTTP HEAD request can be sent to find out the image's updated time and only if it is different from the one that have downloaded, re-download the image can be done. This approach can even be extended for displaying information snippets. The HTTP HEAD request can be sent to fetch a brief description about the content (e.g., document snapshot image giving basic information about the document) instead of fully downloading the content. Further, upon receipt of the image (e.g., step 545), the received image is rendered on a graphical user interface through the interactive graphical document insight element (e.g., step 550).

In one exemplary embodiment, the keywords related to a link may also point to an agnostic viewable content (e.g., links to external documents such a Microsoft® Word, a Microsoft® Excel, an Adobe® PDF, and the like). The metadata of the agnostic viewable content associated with the document is retrieved using HTTP HEAD request to read a 'Content-Type' field and a 'Content-Disposition' field. Further, the link may or may not contain the actual file name or type. For example, consider the URL http://www.myurl.comSalesData.xls. This indicates that the file name is 'SalesData' and type is Microsoft® Excel document. However, in many cases, the URL may not indicate the name and type of the document. For example, consider the URL http://www.myurl.com/AXTSBRTD3RWD. In this case, the HTTP HEAD is used to read the "Content-Type" and "Content-Disposition" fields of the HTTP response to determine the type of the document and its original name. This improves consumption experience with a reduced data transfer. For example, the relevant headers can be Content-Disposition: attachment; filename="AnnualReport2012.pdf" Content-Type: application/pdf. Therefore, it can be understood that the type is Adobe® PDF document and name of the document should be shown as "Annual Report 2012". Also, similar approach can be used for other document types.

Some embodiments may include the above-described methods being written as one or more software components. These components, and the functionality associated with each, may be used by client, server, distributed, or peer computer systems. These components may be written in a computer language corresponding to one or more programming languages such as, functional, declarative, procedural, object-oriented, lower level languages and the like. They may be linked to other components via various application programming interfaces and then compiled into one complete application for a server or a client. Alternatively, the components maybe implemented in server and client applications. Further, these components may be linked together via various distributed programming protocols. Some example embodiments may include remote procedure calls being used to implement one or more of these components across a distributed programming environment. For example, a logic level may reside on a first computer system that is remotely located from a second computer system containing an interface level (e.g., a graphical user interface). These first and second computer systems can be configured in a server-client, peer-to-peer, or some other configuration. The clients can vary in complexity from mobile and handheld devices, to thin clients and on to thick clients or even other servers.

The above-illustrated software components are tangibly stored on a computer readable storage medium as instructions. The term "computer readable storage medium" should be taken to include a single medium or multiple media that stores one or more sets of instructions. The term "computer readable storage medium" should be taken to include any physical article that is capable of undergoing a set of physical changes to physically store, encode, or otherwise carry a set of instructions for execution by a computer system which causes the computer system to perform any of the methods or process steps described, represented, or illustrated herein. A computer readable storage medium may be a non-transitory computer readable storage medium. Examples of a non-transitory computer readable storage media include, but are not limited to: magnetic media, such as hard disks, floppy disks, and magnetic tape; optical media such as CD-ROMs, DVDs and holographic devices; magneto-optical media; and hardware devices that are specially configured to store and execute, such as application-specific integrated circuits ("ASICs"), programmable logic devices ("PLDs") and ROM and RAM devices. Examples of computer readable instructions include machine code, such as produced by a compiler, and files containing higher-level code that are executed by a computer using an interpreter. For example, an embodiment may be implemented using Java, C++, or other object-oriented programming language and development tools. Another embodiment may be implemented in hard-wired circuitry in place of, or in combination with machine readable software instructions.

Figure 6:
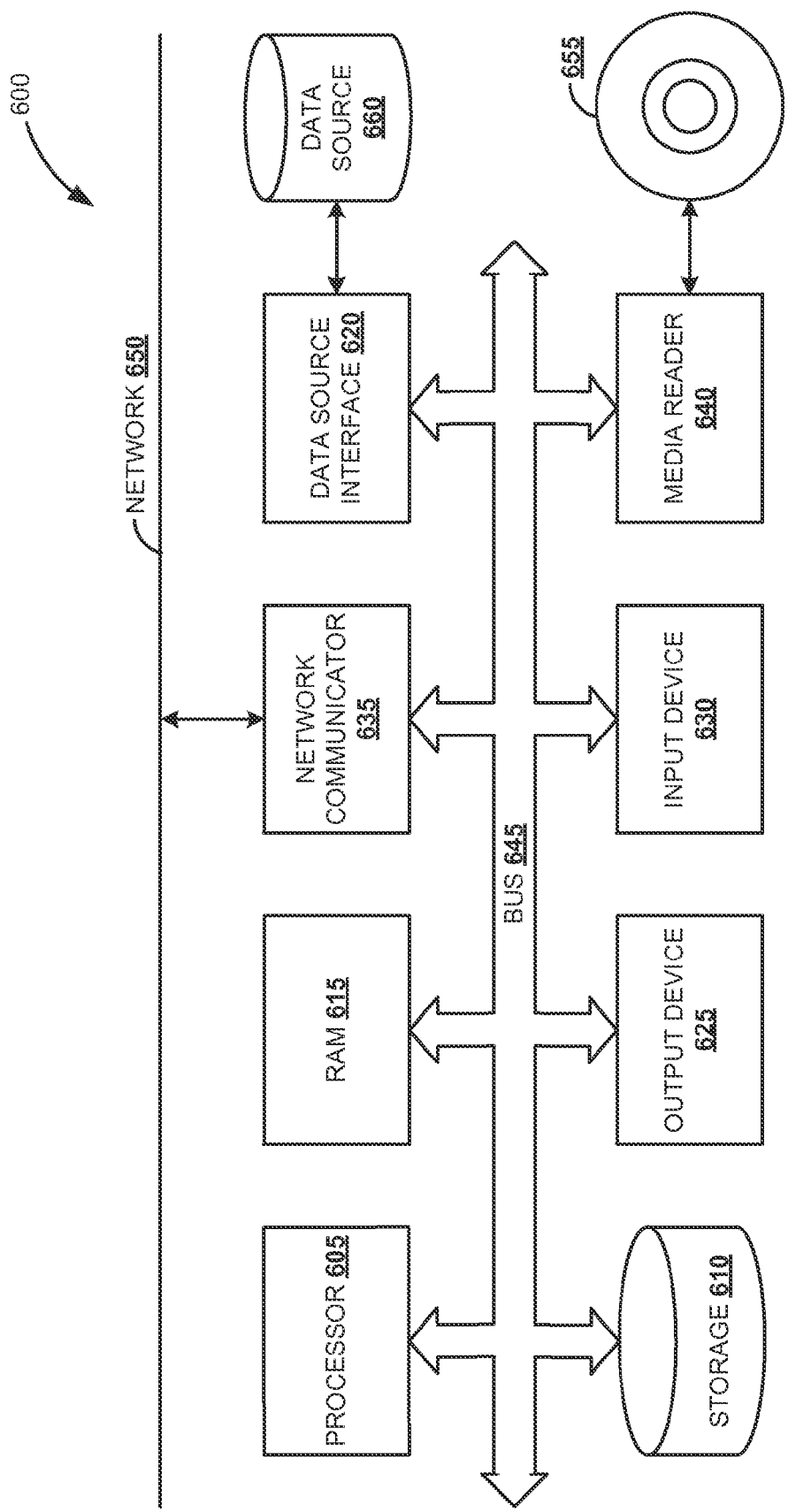
FIG. 6 is a block diagram of an exemplary computer system, according to an embodiment.

FIG. 6 is a block diagram of an exemplary computer system 600. The computer system 600 includes a processor 605 that executes software instructions or code stored on a computer readable storage medium 655 to perform the above-illustrated methods. The processor 605 can include a plurality of cores. The computer system 600 includes a media reader 640 to read the instructions from the computer readable storage medium 655 and store the instructions in storage 610 or in random access memory (RAM) 615. The storage 610 provides a large space for keeping static data where at least some instructions could be stored for later execution. According to some embodiments, such as some in-memory computing system embodiments, the RAM 615 can have sufficient storage capacity to store much of the data required for processing in the RAM 615 instead of in the storage 610. In some embodiments, all of the data required for processing may be stored in the RAM 615. The stored instructions may be further compiled to generate other representations of the instructions and dynamically stored in the RAM 615. The processor 605 reads instructions from the RAM 615 and performs actions as instructed. According to one embodiment, the computer system 600 further includes an output device 625 (e.g., a display) to provide at least some of the results of the execution as output including, but not limited to, visual information to users and an input device 630 to provide a user or another device with means for entering data and/or otherwise interact with the computer system 600. Each of these output devices 625 and input devices 630 could be joined by one or more additional peripherals to further expand the capabilities of the computer system 600. A network communicator 635 may be provided to connect the computer system 600 to a network 650 and in turn to other devices connected to the network 650 including other clients, servers, data stores, and interfaces, for instance. The modules of the computer system 600 are interconnected via a bus 645. Computer system 600 includes a data source interface 620 to access data source 660. The data source 660 can be accessed via one or more abstraction layers implemented hardware or software. For example, the data source 660 may be accessed by network 650. In some embodiments the data source 660 may be accessed via an abstraction layer, such as, a semantic layer.

A data source is an information resource. Data sources include sources of data that enable data storage and retrieval. Data sources may include databases, such as, relational, transactional, hierarchical, multi-dimensional (e.g., OLAP), object oriented databases, and the like. Further data sources include tabular data (e.g., spreadsheets, delimited text files), data tagged with a markup language (e.g., XML data), transactional data, unstructured data (e.g., text files, screen scrapings), hierarchical data (e.g., data in a file system, XML data), files, a plurality of reports, and any other data source accessible through an established protocol, such as, Open Data Base Connectivity (ODBC), produced by an underlying software system (e.g., ERP system), and the like. Data sources may also include a data source where the data is not tangibly stored or otherwise ephemeral such as data streams, broadcast data, and the like. These data sources can include associated data foundations, semantic layers, management systems, security systems and so on.

In the above description, numerous specific details are set forth to provide a thorough understanding of embodiments. One skilled in the relevant art will recognize, however that the embodiments can be practiced without one or more of the specific details or with other methods, components, techniques, etc. In other instances, well-known operations or structures are not shown or described in details.

Although the processes illustrated and described herein include series of steps, it will be appreciated that the different embodiments are not limited by the illustrated ordering of steps, as some steps may occur in different orders, some concurrently with other steps apart from that shown and described herein. In addition, not all illustrated steps may be required to implement a methodology in accordance with the one or more embodiments. Moreover, it will be appreciated that the processes may be implemented in association with the apparatus and systems illustrated and described herein as well as in association with other systems not illustrated.

The above descriptions and illustrations of embodiments, including what is described in the Abstract, is not intended to be exhaustive or to limit the one or more embodiments to the precise forms disclosed. While specific embodiments of, and examples for, the one or more embodiments are described herein for illustrative purposes, various equivalent modifications are possible within the scope of the embodiments, as those skilled in the relevant art will recognize. These modifications can be made in light of the above detailed description. Rather, the scope is to be determined by the following claims, which are to be interpreted in accordance with established doctrines of claim construction.

What is claimed is:

1. A non-transitory computer-readable medium storing instructions, which when executed cause a computer system to:
   receive metadata associated with a document stored in a memory, wherein the document comprises at least one of web content and non-web content and the metadata comprises one or more keywords associated with the document that explain the document;
   extract at least one keyword from the received metadata;
   classify the at least one keyword as having actionable information or non-actionable information;
   generate an interactive graphical document insight element based on the extracted at least one keyword, comprising:
      a representation of the non-actionable information, wherein the non-actionable information provides static information associated with the document; or
      one or more interactive icons representing the actionable information, wherein the actionable information provides further action to be performed associated with the document; and
   render the generated interactive graphical document insight element on a computer generated user interface to provide access to the non-actionable information or the actionable information of the document without opening the document.

2. The non-transitory computer-readable medium of claim 1, wherein the non-actionable information comprises at least one of an image representing the document, a title of the document and a description of the document.

3. The non-transitory computer-readable medium of claim 2, wherein the image metadata is retrieved from a repository associated with the document using HTTP HEAD request.

4. The non-transitory computer-readable medium of claim 1, wherein the actionable information comprises at least one of contact information, a link to agnostic viewable content and a link to live collaboration.

5. The non-transitory computer-readable medium of claim 4, wherein the agnostic viewable content metadata associated with the document is retrieved using HTTP HEAD request to read a 'Content-Type' field and a 'Content-Disposition' field.

6. The non-transitory computer-readable medium of claim 1, wherein the one or more interactive icons is operable to perform actions corresponding to the actionable information.

7. The non-transitory computer-readable medium of claim 1, wherein the metadata of the document comprises an URL associated with the document and the at least one keyword is extracted by parsing the URL.

8. A computer implemented method to provide an interactive graphical document insight element, the method comprising:
   receiving metadata associated with a document stored in a memory, wherein the document comprises at least one of web content and non-web content and metadata comprises one or more keywords associated with the document that explain the document;
   extracting at least one keyword from the received metadata;
   classifying the at least one keyword as having actionable information or non-actionable information;
   generating the interactive graphical document insight element from the extracted at least one keyword comprising:
      a representation of the non-actionable information, wherein the non-actionable information provides static information associated with the document; or
      one or more interactive icons representing the actionable information, wherein the actionable information provides further action to be performed associated with the document; and
   rendering the generated interactive graphical document insight element on a computer generated user interface to provide access to the non-actionable information or the actionable information of the document without opening the document.

9. The computer implemented method of claim 8, wherein the non-actionable information comprises at least one of an image representing the document, a title of the document and a description of the document.

10. The computer implemented method of claim 9, wherein the image metadata is retrieved from a repository associated with the document using HTTP HEAD request.

11. The computer implemented method of claim 8, wherein the actionable information comprises at least one of contact information, a link to agnostic viewable content and a link to live collaboration.

12. The computer implemented method of claim 11, wherein the agnostic viewable content metadata associated with the document is retrieved using HTTP HEAD request to read a 'Content-type' field and a 'Content-Disposition' field.

13. The computer implemented method of claim 8, wherein the one or more interactive icons provides an option to perform actions corresponding to the actionable information.

14. The computer implemented method of claim 8, wherein the metadata of the document comprises an URL associated with the document and the at least one keyword is extracted by parsing the URL.

15. A computer system to provide an interactive graphical document insight element, the computer system comprising:
   at least one processor; and
   one or more memory devices communicative with the at least one processor, wherein the one or more memory devices store instructions to:
      receive metadata associated with a document stored in a memory, wherein the document comprises at least one of web content and non-web content and the metadata includes one or more keywords associated with the document that explains the document;
      extract at least one keyword from the received metadata;
      classify the at least one keyword as having actionable information or non-actionable information;
      generate the interactive graphical document insight element comprising:
         a representation of the non-actionable information, wherein the non-actionable information provides static information associated with the document; or
         one or more interactive icons representing the actionable information, wherein the actionable information provides further action to be performed associated with the document; and
      render the generated interactive graphical document insight element on a computer generated user interface to provide access to the non-actionable information or the actionable information of the document without opening the document.

16. The computer system of claim 15, wherein the non-actionable information comprises at least one of an image representing the document, a title of the document and a description of the document.

17. The computer system of claim 16, wherein the image metadata is retrieved from a repository associated with the document using HTTP HEAD request.

18. The computer system of claim 15, wherein the actionable information comprises at least one of contact information, a link to agnostic viewable content and a link to live collaboration.

19. The computer system of claim 15, wherein the one or more interactive icons provides an option to perform actions corresponding to the actionable information.

20. The computer system of claim 15, wherein the metadata of the document comprises an URL associated the document and the at least one keyword is extracted by parsing the URL.

* * * * *